US011647206B2

(12) United States Patent
Iwamura et al.

(10) Patent No.: US 11,647,206 B2
(45) Date of Patent: May 9, 2023

(54) INTRA PREDICTION DEVICE, IMAGE ENCODING DEVICE, IMAGE DECODING DEVICE AND PROGRAM

(71) Applicant: NIPPON HOSO KYOKAI, Tokyo (JP)

(72) Inventors: Shunsuke Iwamura, Tokyo (JP); Atsuro Ichigaya, Tokyo (JP); Shimpei Nemoto, Tokyo (JP)

(73) Assignee: NIPPON HOSO KYOKAI, Tokyo (JP)

( * ) Notice: Subject to any disclaimer, the term of this patent is extended or adjusted under 35 U.S.C. 154(b) by 0 days.

(21) Appl. No.: 17/174,882

(22) Filed: Feb. 12, 2021

(65) Prior Publication Data

US 2021/0168375 A1 Jun. 3, 2021

Related U.S. Application Data

(63) Continuation of application No. PCT/JP2019/031557, filed on Aug. 9, 2019.

(30) Foreign Application Priority Data

Aug. 15, 2018 (JP) .............................. JP2018-152989

(51) Int. Cl.
*H04N 19/176* (2014.01)
*H04N 19/159* (2014.01)
*H04N 19/186* (2014.01)

(52) U.S. Cl.
CPC ......... *H04N 19/159* (2014.11); *H04N 19/176* (2014.11); *H04N 19/186* (2014.11)

(58) Field of Classification Search
CPC .. H04N 19/105; H04N 19/117; H04N 19/159; H04N 19/176; H04N 19/186; H04N 19/593

See application file for complete search history.

(56) References Cited

U.S. PATENT DOCUMENTS 10,873,746 B2 12/2020 Ikai et al.
2014/0023139 A1* 1/2014 Xu ................... H04N 19/00569
375/240.12

(Continued)

FOREIGN PATENT DOCUMENTS

CN 104871537 A * 8/2015 ............. H04N 19/11
JP 2018-078409 A 5/2018
WO 2018116925 A1 6/2018

OTHER PUBLICATIONS

Chen, Quing-ye, Color Between Frames In Predicting Method, Aug. 26, 2015 (Year: 2015).*

(Continued)

*Primary Examiner* — Md N Haque
(74) *Attorney, Agent, or Firm* — Studebaker & Brackett PC

(57) ABSTRACT

An intra predictor (181) for performing intra prediction on each of blocks obtained by dividing an original image in the form of a frame, the intra predictor (181) includes; a linear model calculator (1811*a*) configured to calculate a linear model of the luminance component and the chroma component of the target block using decoded pixel values of the luminance component and decoded pixel values of the chroma component around the target block on which the intra prediction is performed; a chroma component predictor (1811*b*) configured to predict pixel values of the chroma component of the target block by applying the linear model calculated by the linear model calculator (1811*a*) to decoded pixel values of a luminance component of the target block; and a chroma component corrector (1812) configured to correct predicted pixel values of the chroma component obtained by the chroma component predictor (1811*b*) using decoded pixel values that were not used to calculate a linear (Continued)

model by the linear model calculator (1811*a*) of decoded pixel values around the target block.

11 Claims, 8 Drawing Sheets

(56) References Cited

U.S. PATENT DOCUMENTS

| | | | | |
|---|---|---|---|---|
| 2015/0281687 | A1* | 10/2015 | Yasugi | H04N 19/105 |
| | | | | 382/166 |
| 2016/0105685 | A1* | 4/2016 | Zou | H04N 19/186 |
| | | | | 375/240.12 |
| 2019/0327466 | A1* | 10/2019 | Ikai | H04N 19/186 |

OTHER PUBLICATIONS

Description of SDR, HDR and 360° video coding technology proposal by Huawei, GoPro, HiSilicon, and Samsung, buJoint Video Exploration Team (JVET) of ITU-T SG 16 WP 3 and ISO/IEC JTC 1/SC 29/WG 11, Document: JVET-J0025_v2 10th Meeting: San Diego, US, Apr. 10-20, 2018.

Description of SDR video coding technology proposal by MediaTek Joint Video Experts Team (JVET) of ITU-T SG 16 WP 3 and ISO/IEC JTC 1/SC 29/WG 11, Document: JVET-J0018 10th Meeting: San Diego, US, Apr. 10-20, 2018.

* cited by examiner

INTRA PREDICTION DEVICE, IMAGE ENCODING DEVICE, IMAGE DECODING DEVICE AND PROGRAM

TECHNICAL FIELD

The present invention relates to an intra prediction device, an image encoding device, an image decoding device and a program.

BACKGROUND ART

In image encoding techniques, intra prediction is widely used, which utilizes spatial correlation in a frame. In intra prediction, decoded pixel values around the prediction target block (hereinafter referred to as the "target block") are used to predict pixel values of the target block.

For example, Patent Literature 1 discloses an image encoding device using the intra predictor being capable of improving encoding efficiency of the intra prediction mode of the chroma signal, in an intra predictor that determines the intra prediction mode for a chroma signal for each block of an image (see Patent Literature 1). As an intra prediction mode, cross-component intra prediction (CCIP) is known, in which pixel values of a chroma component are predicted using decoded pixel values of a luminance (luma) component. In particular, cross-component intra prediction is an intra prediction mode in which a linear model of a luminance component and a chroma component of the target block is calculated using decoded pixels of the luminance component and the chroma component directly on top of and on the left of the target block, and the pixel values of the chroma component in the block are predicted using the calculated linear model. Cross-component intra prediction may also be referred to as cross-component linear model (CCLM) prediction.

In cross-component intra prediction, a chroma component signal can be accurately predicted by taking advantage of the fact that the relationship between the signal distributions of decoded pixels of a luminance component and a chroma component on top of and on the left of the target block can approximate the relationship between the signal distributions of the luminance component and the chroma component of the target block. However, because cross-component intra prediction always uses decoded pixels on top of and on the left of the target block, if the relationship between the signal distributions of a luminance component and a chroma component on top of the target block is different from the relationship between the signal distributions of the luminance component and the chroma component on the left of the target block, an accurate linear model cannot be calculated, which leads to a reduction in prediction accuracy of the chroma component.

In view of the problem mentioned above, Non Patent Literature 1 describes the following new intra prediction modes for a chroma component: a CCIP_A mode and a CCIP_L mode. In the CCIP_A mode, a linear model is calculated using decoded pixels of a luminance component and a chroma component only on top of the target block, instead of decoded pixels of the luminance component and the chroma component both on top of and on the left of the target block. In the CCIP_L mode, a linear model is calculated using decoded pixels of a luminance component and a chroma component only on the left of the target block. In Non Patent Literature 2, similar intra prediction modes are described and an intra prediction mode corresponding to the CCIP_A mode is referred to as an LM-top mode and an intra prediction mode corresponding to the CCIP_L mode is referred to as an LM-left mode.

CITATION LIST

Patent Literature

Patent Literature 1: Japanese Patent Application Laid-Open No. 2018-078409

Non Patent Literature

Non Patent Literature 1
JVET-J0025, "Description of SDR, HDR and 360° video coding technology proposal by Qualcomm and Technicolormedium complexity version" retrieved on May 22, 2018, <URL: http://phenix.it-sudparis.eu/jvet/doc_end_user/documents/10_San%20Diego/wg11/JVET-J0025-v4.zip>

Non Patent Literature 2
JVET-J0018, "Description of SDR video coding technology proposal by MediaTek" retrieved on May 22, 2018, <URL: http://phenix.it-sudparis.eu/jvet/doc_end_user/documents/10_San%20Diego/wg11/JVET-J0018-v2.zip>

SUMMARY OF INVENTION

Technical Problem

However, the residual signal (prediction residual) of a block applying the CCIP_A mode or the CCIP_L mode is likely to have an uneven energy distribution.

For example, in the CCIP_A mode, decoded pixels of a luminance component and a chroma component on top of the target block is used to calculate a linear model, and therefore prediction accuracy in the top edge area of the block is likely to increase. In contrast, prediction accuracy in the bottom edge area of the block, which is far from the decoded pixels used to calculate the linear model, is likely to decrease.

Similarly, in the CCIP_L mode, decoded pixel values of a luminance component and a chroma component on the left of the target block are used to calculate a linear model, and therefore prediction accuracy of the chroma component in the left edge area of the block is likely to increase, while prediction accuracy in the right edge area of the block, which is far from the decoded pixels used to calculate the linear model, is likely to decrease.

An area where prediction accuracy is low leads to a problem that an increase in energy of a prediction residual, thereby decreasing encoding efficiency.

In view of the above, an object of the present invention is to provide an intra prediction device, image encoding device, image decoding device and program in which encoding efficiency is improved when cross-component intra prediction is used.

Solution to Problem

An intra prediction device according to a first feature for performing intra prediction on each of blocks obtained by dividing an original image in the form of a frame, the intra prediction device includes: a linear model calculator configured to calculate a linear model using decoded pixels of a first component and a second component around a target block on which the intra prediction is performed; a predictor configured to predict pixels of the second component of the target block by applying the linear model calculated by the linear model calculator to decoded pixels of the first component of the target block; and a corrector configured to correct predicted pixels of the second component obtained by the predictor based on positions of the decoded pixels used by the linear model calculator to calculate the linear model.

The intra prediction device corrects predicted pixels of the second component obtained by the predictor based on positions of the decoded pixels used by the linear model calculator to calculate the linear model so that accuracy of the predicted pixels (i.e., prediction accuracy) of the second component can be increased to improve encoding efficiency.

An image encoding device according to a second feature includes an intra prediction device described in the first feature.

An image decoding device according to a third feature includes an intra prediction device described in the first feature.

A program according to a fourth feature causes a computer to function as the intra prediction device described in the first feature.

Advantageous Effect of Invention

The present invention can provide an intra prediction device, image encoding device, image decoding device and program in which encoding efficiency is improved when cross-component intra prediction is used.

DESCRIPTION OF EMBODIMENTS

An image encoding device and an image decoding device according to a present embodiment of the invention are described with reference to the accompanying drawings. The image encoding device and the image decoding device according to the present embodiment encode and decode videos such as MPEG videos. In the description of the drawings below, the same or similar reference signs are used for the same or similar parts.

1. CONFIGURATION OF IMAGE ENCODING DEVICE

Figure 1:
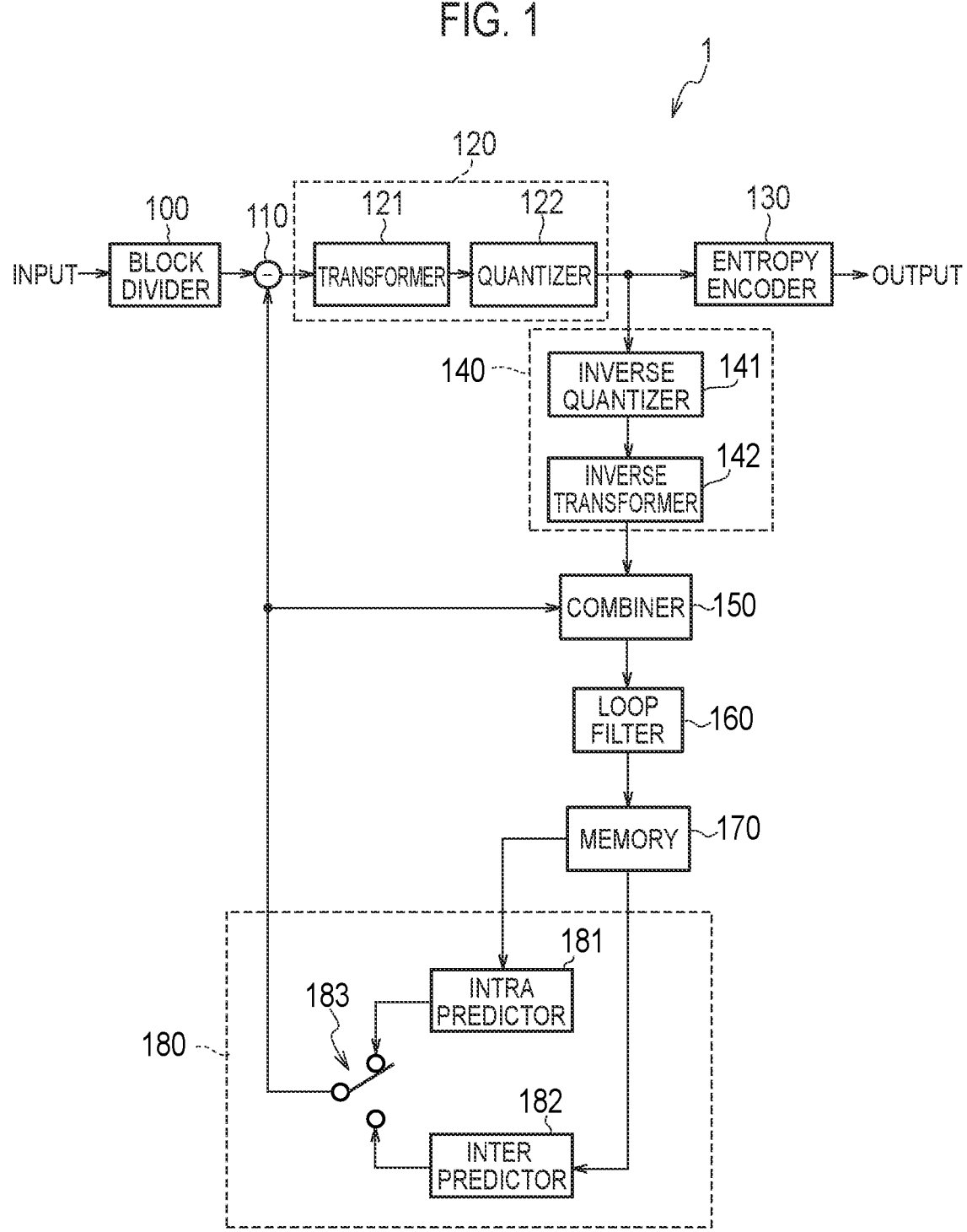
FIG. 1 is a diagram illustrating a configuration of an image encoding device according to an embodiment.

FIG. 1 is a diagram illustrating a configuration of the image encoding device 1 according to the present embodiment.

As shown in FIG. 1, the image encoding device 1 includes a block divider 100, a subtractor 110, a transformer/quantizer 120, an entropy encoder 130, an inverse quantizer/inverse transformer 140, a combiner 150, loop filter 160, a memory 170, and a predictor 180.

The block divider 100 divides an input image given in the form of a frame (or a picture) that constitutes a part of a video into sub-areas in the form of blocks and outputs the resulting blocks to the subtractor 110. Each pixel of the input image includes a luminance component (Y) and a chroma component ($C_b$, $C_r$). The size of the blocks may be 32×32 pixels, 16×16 pixels, 8×8 pixels, or 4×4 pixels. The shape of the blocks is not limited to square and may be rectangular. A block is the unit of encoding by the image encoding device 1 and of decoding by the image decoding device 2.

In the present embodiment, the block divider 100 divides an input image into blocks called (coding units) CUs. A CU includes a luminance component block and a chroma component block. The image encoding device 1 can encode the luminance component block and the chroma component block of one CU separately. Similarly, the image decoding device 2 can decode the luminance component block and the chroma component block of a CU separately.

The subtractor 110 calculates a prediction residual indicating pixel-by-pixel differences between a block input by the block divider 100 and a predicted image (predicted block) of the input block predicted by the predictor 180. More specifically, the subtractor 110 calculates the prediction residual by subtracting each pixel value of the predicted image from the corresponding pixel value of the input block and outputs the calculated prediction residual to the transformer/quantizer 120.

The transformer/quantizer 120 executes an orthogonal transform process and a quantization process on each of blocks. The transformer/quantizer 120 includes a transformer 121 and a quantizer 122.

The transformer 121 performs an orthogonal transformation on a predicted residual input by the subtractor 110 to calculates transform coefficients and outputs the calculated transform coefficients to the quantizer 122. Examples of the orthogonal transformation include the discrete cosine transformation (DCT), the discrete sine transformation (DST) and the Karhunen-Loeve transformation (KLT).

The quantizer 122 quantizes transform coefficients input by the transformer 121 using a quantization parameter (Qp) and a quantization matrix to generate quantized transform coefficients. The quantization parameter (Qp) is a parameter that is equally applied to every transform coefficient in a block and controls the granularity of quantization. The quantization matrix is a matrix the elements of which are quantizer values used to quantize respective transform coefficients. The quantizer 122 outputs information on the generated quantized transform coefficients and quantization control information to the entropy encoder 130 and the inverse quantizer/inverse transformer 140.

The entropy encoder 130 entropy-encodes quantized transform coefficients input by the quantizer 122, compresses the resulting entropy-encoded quantized transform coefficients to generate encoded data (bitstream), and outputs the encoded data out of the image encoding device 1. Huffman coding and context-based adaptive binary arithmetic coding (CABAC) can be used for the entropy encoding. The entropy encoder 130 receives control information for filtering input by the loop filter 160 and control information for prediction input by the predictor 180. The entropy encoder 130 also entropy-encodes such control information.

The inverse quantizer/inverse transformer 140 executes an inverse quantization process and an inverse orthogonal transform process on each of blocks. The inverse quantizer/ inverse transformer 140 includes an inverse quantizer 141 and an inverse transformer 142.

The inverse quantizer 141 performs the inverse quantization process corresponding to the quantization process performed by the quantizer 122. More specifically, the inverse quantizer 141 inverse quantizes quantized transform coefficients input from the quantizer 122 using the quantization parameter (Qp) and the quantization matrix to restore the transform coefficients and outputs the restored transform coefficients to the inverse transformer 142.

The inverse transformer 142 performs the inverse orthogonal transform process corresponding to the orthogonal transform process performed by the transformer 121. For example, if the transformer 121 performs the discrete cosine transformation, the inverse transformer 142 performs the inverse discrete cosine transformation. The inverse transformer 142 performs the inverse orthogonal transformation on transform coefficients input from the inverse quantizer 141 to restore the prediction residual and outputs a restored prediction residual to the combiner 150.

The combiner 150 combines a restored prediction residual input by the inverse transformer 142 and a predicted image input by the predictor 180 pixel by pixel. The combiner 150 reconstructs (decodes) the block by adding each pixel value of the restored prediction residual to the corresponding pixel value of the predicted image, and outputs the decoded image on each of decoded blocks to the loop filter 160. A decoded image may be referred to as a reconstructed image.

The loop filter 160 performs loop filtering, which is post-filtering, on a decoded image input by the combiner 150 and outputs the filtered decoded image to the memory 170. The loop filter 160 also outputs control information for the loop filtering to entropy encoder 130.

The memory 170 stores a decoded image input by the loop filter 160. The memory 170 stores decoded images in units of frames. The memory 170 outputs a stored decoded image to the predictor 180.

The predictor 180 performs prediction on each of blocks. The predictor 180 includes an intra predictor 181, an inter predictor 182 and a switch 183.

The intra predictor 181 is an intra prediction device that performs intra prediction on each of the blocks obtained by dividing an original image in the form of a frame. The intra predictor 181 generates an intra-predicted image by referring to decoded pixel values around the prediction target block in a decoded image stored in the memory 170 and outputs the generated intra-predicted image to the switch 183. The decoded pixel values around a block may be the values of any decoded pixels that can be referred to in performing intra prediction on the block, and are not limited to the values of decoded pixels adjacent to the block. The intra predictor 181 selects the optimal intra prediction mode to be applied to the target block from a plurality of intra prediction modes and uses the selected intra prediction mode to perform intra prediction. The intra predictor 181 outputs control information for the selected intra prediction mode to the entropy encoder 130. The intra prediction modes include Planar prediction, DC prediction and directional prediction.

In the present embodiment, the intra predictor 181 can select cross-component intra prediction (CCIP) as an intra prediction mode to be applied to the chroma component of the prediction target CU (target block). In CCIP, decoded pixel values of the luminance component of the CU are used to predict pixel values of the chroma component of the CU. The intra predictor 181 performs intra prediction of the luminance component of the CU first, and the memory 170 stores the decoded pixel values of the luminance component of the CU in advance.

Figure 2:
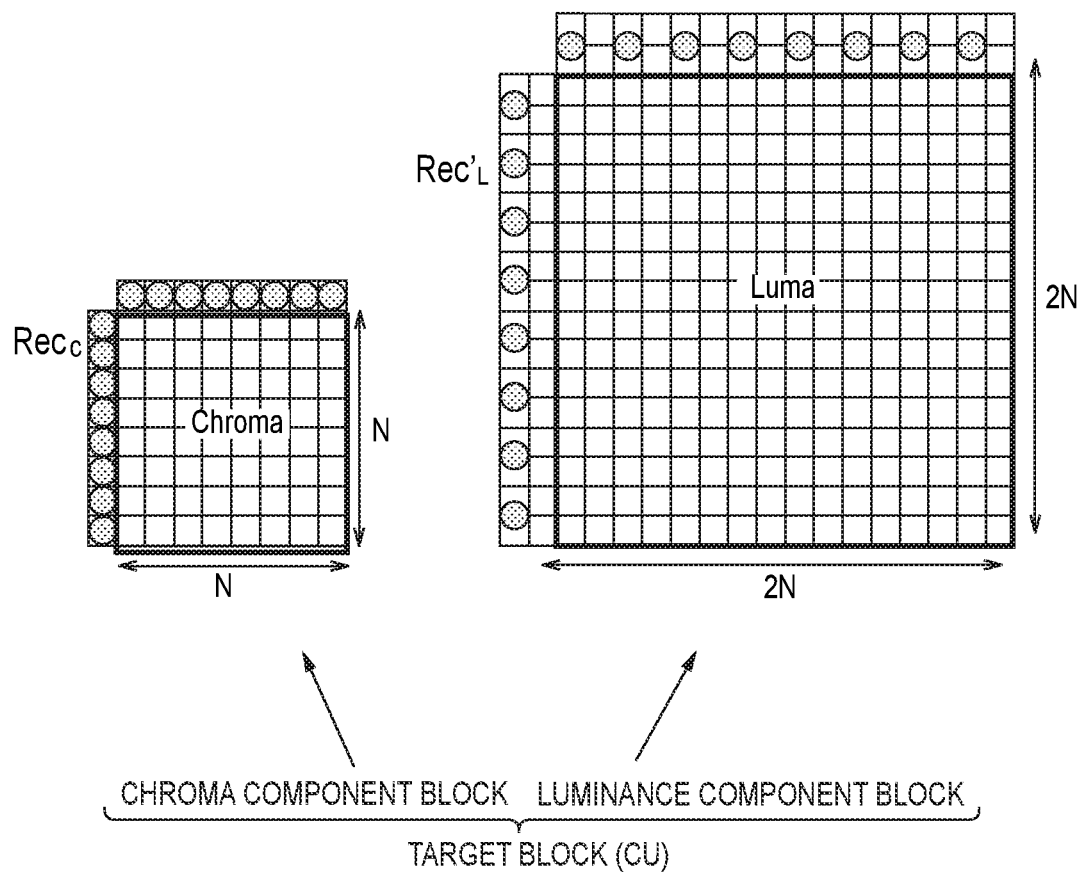
FIG. 2 is a diagram illustrating the normal CCIP mode.
Figure 3:
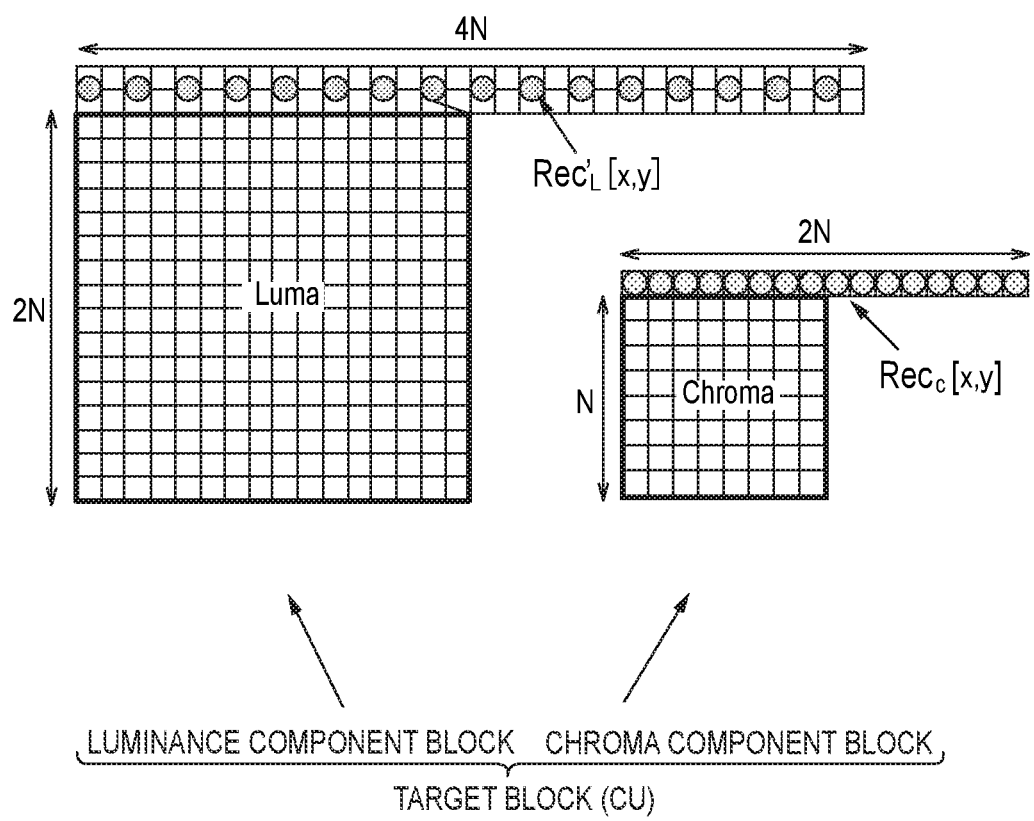
FIG. 3 is a diagram illustrating the CCIP_A mode.
Figure 4:
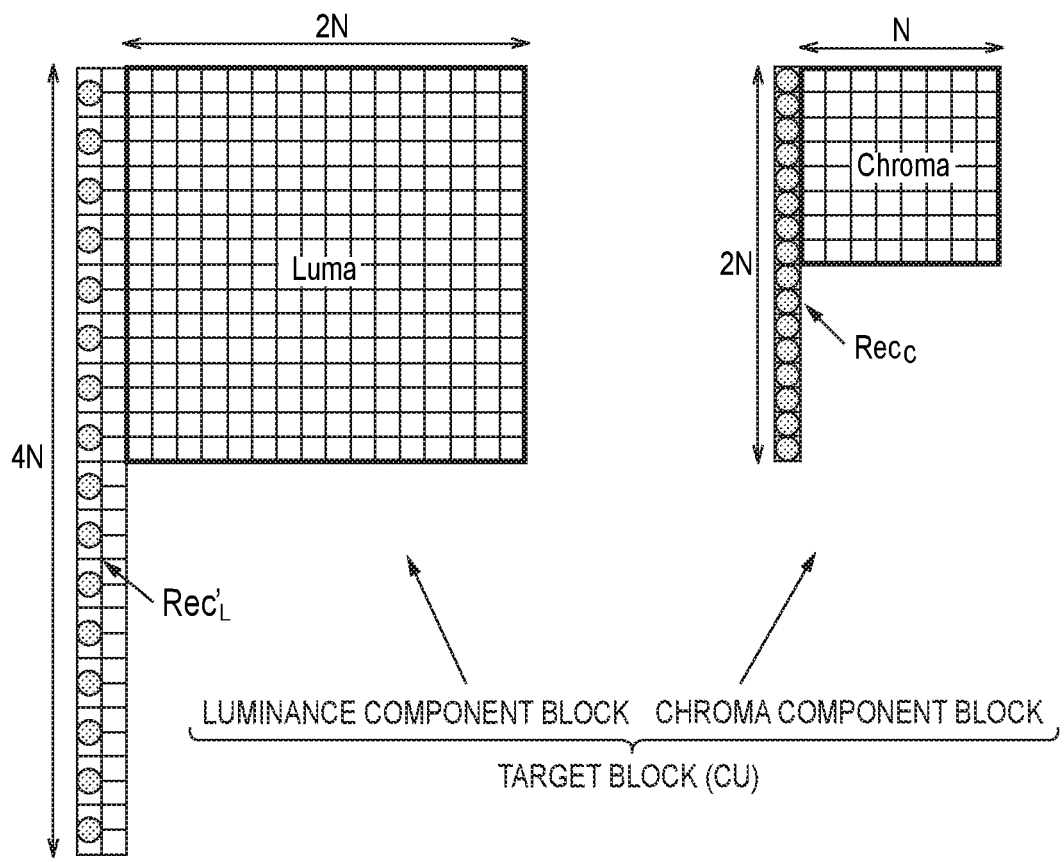
FIG. 4 is a diagram illustrating the CCIP_L mode.

In the present embodiment, CCIP includes the following three modes: normal CCIP, CCIP_A and CCIP_L. FIG. 2 is a diagram illustrating the normal CCIP mode, FIG. 3 is a diagram illustrating the CCIP_A mode, and FIG. 4 is a diagram illustrating the CCIP_L mode.

As shown in FIG. 2, in the normal CCIP mode, the intra predictor 181 calculates a linear model of the luminance component and the chroma component of a CU using decoded pixel values of the luminance component and the chroma component on top of and on the left of the CU, and uses the calculated linear model to predict pixel values of the chroma component of the CU. In the normal CCIP mode, a chroma component signal can be accurately predicted by taking advantage of the fact that the relationship between the signal distributions of decoded pixels of the luminance component and the chroma component on top of and on the left of a CU can approximate the relationship between the signal distributions of the luminance component and the chroma component of the CU.

As described in the aforementioned non patent literature and JVET-G1001-V1, for example, the intra predictor 181 calculates a predicted pixel value $pred_c(i, j)$ of the chroma component (Cb) of a CU according to expression (1) below. Expression (1) represents a linear model.

[Expression 1]

$$pred_c(i,j) = \alpha \cdot rec_L'(i,j) + \beta \quad (1)$$

In expression (1), $rec_L'(i, j)$ denotes down-sampled decoded pixel values of the luminance component of the CU (down-sampled reconstructed luma samples).

$\alpha$ and $\beta$ are calculated by the following expressions (2) and (3).

[Expression 2]

$$\alpha = \frac{N \cdot \sum (L(n) \cdot C(n)) - \sum L(n) \cdot \sum C(n)}{N \cdot \sum (L(n) \cdot L(n)) - \sum L(n) \cdot \sum L(n)} \quad (2)$$

$$\beta = \frac{\sum C(n) - \alpha \cdot \sum L(n)}{N} \quad (3)$$

In expressions (2) and (3), L(n) denotes down-sampled decoded pixel values of the luminance component on top of and on the left of the CU (top and left neighbouring reconstructed luma samples). C(n) denotes decoded pixel values of the chroma component on top of and on the left of the CU (top and left neighbouring reconstructed chroma samples).

As can be seen, because the normal CCIP always uses decoded pixel values on top of and on the left of a CU, if the relationship between the signal distributions of the luminance component and the chroma component on top of the CU is different from the relationship between the signal distributions of the luminance component and the chroma component on the left of the CU, an accurate linear model cannot be calculated, which leads to a reduction in prediction accuracy of the chroma component.

The CCIP_A and CCIP_L modes are desirable in a case where the relationship between the signal distributions of the luminance component and the chroma component on top of a CU is different from the relationship between the signal distributions of the luminance component and the chroma component on the left of the CU.

As shown in FIG. 3, in the CCIP_A mode, the intra predictor 181 calculates a linear model using decoded pixel values of the luminance component and the chroma component only on top of a CU, instead of decoded pixel values of the luminance component and the chroma component both on top of and on the left of the CU. In the CCIP_A mode, decoded pixel values of the luminance component and the chroma component on top of a CU are used to calculate a linear model, and therefore prediction accuracy of the chroma component in the top edge area of the CU is likely to increase. In contrast, prediction accuracy of the chroma component in the bottom edge area, which is far from the decoded pixel values used to calculate the linear model, is likely to decrease.

As shown in FIG. 4, in the CCIP_L mode, the intra predictor 181 calculates a linear model using decoded pixel values of the luminance component and the chroma component only on the left of a CU, instead of decoded pixel values of the luminance component and the chroma component both on top of and on the left of the CU. In the CCIP_L mode, decoded pixel values of the luminance component and the chroma component on the left of a CU are used to calculate a linear model, and therefore prediction accuracy of the chroma component in the left edge area of the CU is likely to increase, while prediction accuracy of the chroma component in the right edge area, which is far from the decoded pixel values used to calculate the linear model, is likely to decrease.

The inter predictor 182 calculates a motion vector by block matching using a decoded image or images stored in the memory 170 as a reference image or images, predicts the prediction target block to generate an inter-predicted image, and outputs the generated inter-predicted image to the switch 183. The inter predictor 182 selects the most suitable inter prediction method from inter prediction methods using multiple reference images (typically, bidirectional prediction methods) and inter prediction methods using single reference image (unidirectional prediction methods), and uses the selected inter prediction method to perform inter prediction.

The switch 183 switches between an intra-predicted image input by the intra predictor 181 and an inter-predicted image input by the inter predictor 182 to output either the intra-predicted image or the inter-predicted image to the subtractor 110 and the combiner 150.

2. CONFIGURATION OF IMAGE DECODING DEVICE

Figure 5:
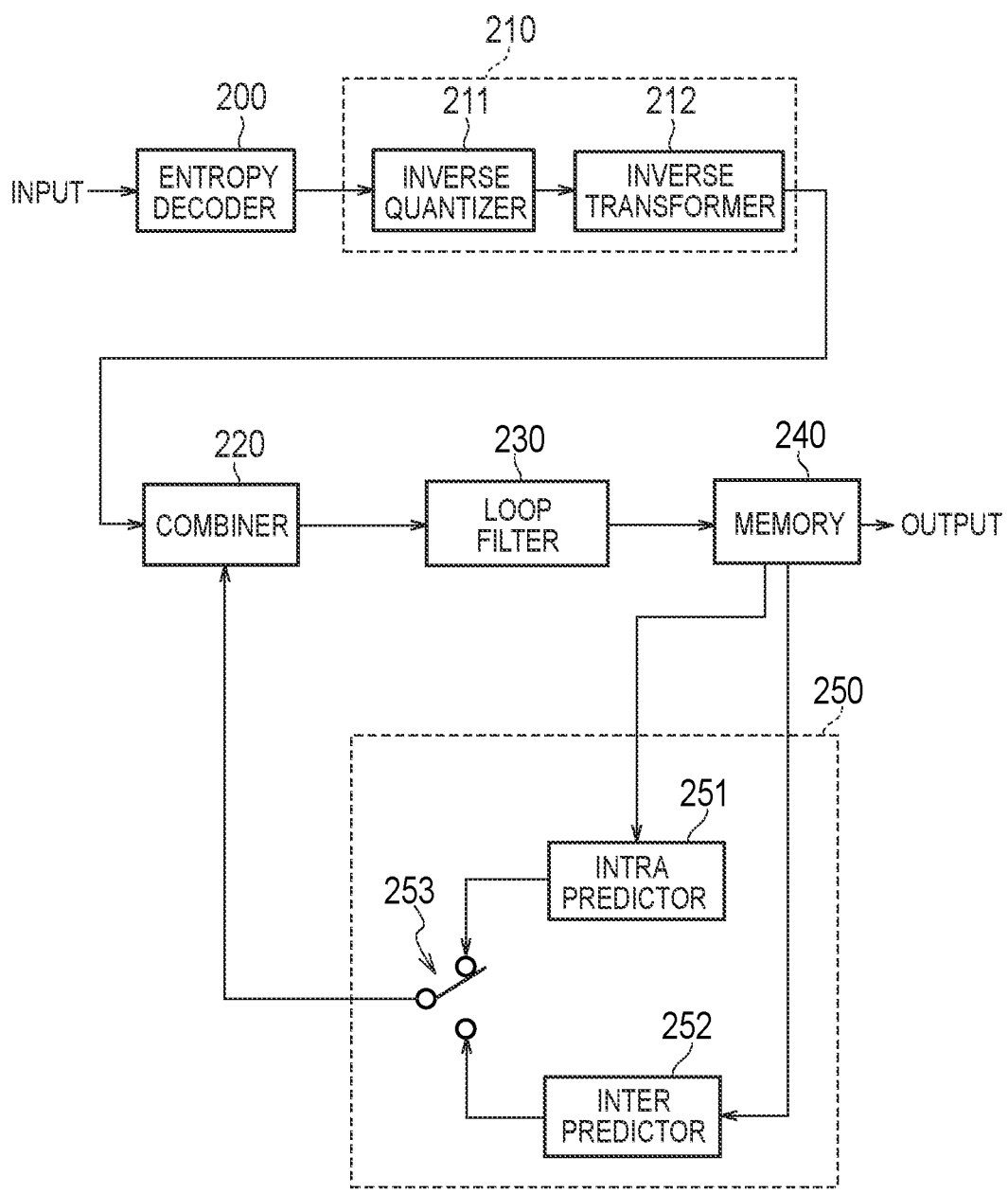
FIG. 5 is a diagram illustrating a configuration of an image decoding device according to the embodiment.

FIG. 5 illustrates the configuration of an image decoding device 2 according to the present embodiment.

As shown in FIG. 5, the image decoding device 2 includes an entropy decoder 200, an inverse quantizer/inverse transformer 210, a combiner 220, a loop filter 230, a memory 240, and a predictor 250.

The entropy decoder 200 decodes encoded data generated by the image encoding device 1 and outputs the decoded quantized transform coefficients to the inverse quantizer/inverse transformer 210. The entropy decoder 200 obtains control information for prediction (intra prediction and inter prediction) and outputs the obtained control information to the predictor 250. The entropy decoder 200 also obtains control information for loop filtering and outputs the obtained control information to the loop filter 230.

The inverse quantizer/inverse transformer 210 that executes an inverse quantization process and an inverse orthogonal transform process on each of blocks. The inverse quantizer/inverse transformer 210 includes an inverse quantizer 211 and an inverse transformer 212.

The inverse quantizer 211 performs the inverse quantization process corresponding to the quantization process performed by the quantizer 122 of the image encoding device 1. The inverse quantizer 211 inverse quantizes quantized transform coefficients input from the entropy code decoder 200 using the quantization parameter (Qp) and the quantization matrix to restore the transform coefficients and outputs the restored transform coefficients to the inverse transformer 212.

The inverse transformer 212 executes the inverse orthogonal transform process corresponding to the orthogonal transform process by the transformer 121 of the image encoding device 1. The inverse transformer 212 performs the inverse orthogonal transformation on transform coefficients input from the inverse quantizer 211 to restore the prediction residual and outputs the restored prediction residual to the combiner 220.

The combiner 220 reconstructs (decodes) the original block by combining a prediction residual input by the inverse transformer 212 and a predicted image input by the predictor 250 pixel by pixel, and outputs the decoded image on each of blocks to the loop filter 230.

The loop filter 230 performs loop filtering, which is similar to the loop filtering performed by the loop filter 160 of the image encoding device 1, on a decoded image input by the combiner 220 based on control information input by the entropy decoder 200, and outputs the filtered decoded image to the memory 240.

The memory 240 stores a decoded image input by the loop filter 230. The memory 240 stores decoded images in units of frames. The memory 240 outputs decoded images in units of frames out of the image decoding device 2.

The predictor 250 performs prediction block by block. The predictor 250 includes an intra predictor 251, an inter predictor 252 and a switch 253.

The intra predictor 251 performs intra prediction to generate an intra-predicted image by referring to a decoded image stored in the memory 240 according to control information input by the entropy decoder 200, and outputs the generated intra-predicted image to the switch 253.

The inter predictor 252 performs inter prediction to predict the prediction target block using a decoded image stored in the memory 240 as a reference image. The inter predictor 252 performs inter prediction to generate an inter-predicted image according to control information (e.g., motion vector information) input by the entropy decoder 200, and outputs the generated inter-predicted image to the switch 253.

The switcher 253 switches between an intra-predicted image input from the intra predictor 251 and an inter-predicted image input from the inter predictor 252 to output either the intra-predicted image or the inter-predicted image to the combiner 220.

3. CONFIGURATION OF INTRA PREDICTOR

Figure 6:
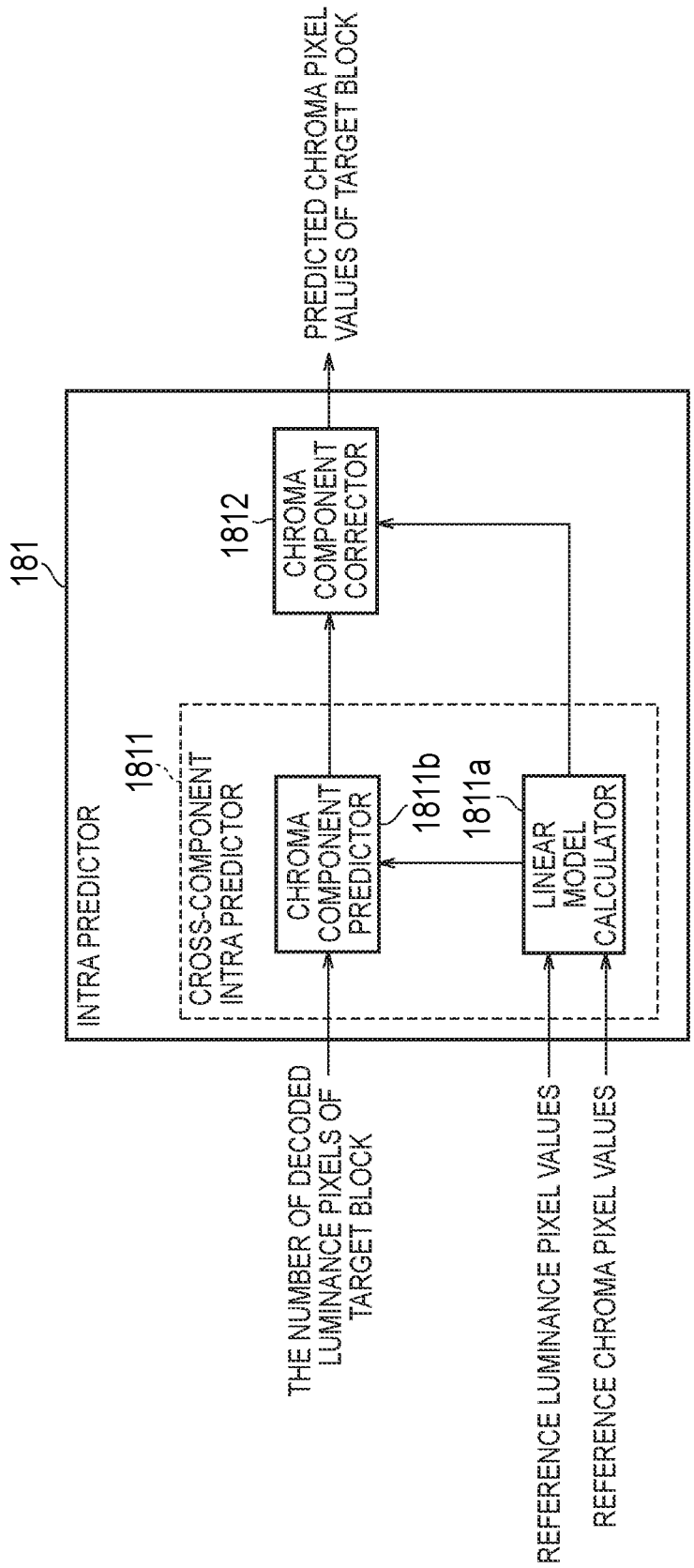
FIG. 6 is a diagram illustrating the configuration of an intra predictor according to the embodiment.

FIG. 6 illustrates the configuration of the intra predictor 181 of the image encoding device 1 according to the present embodiment. The intra predictor 251 of the image decoding device 2 is configured similar to the intra predictor 181 of the image encoding device 1.

As shown in FIG. 6, the intra predictor 181 according to the present embodiment includes a cross-component intra predictor 1811 that predicts pixel values of the chroma component of the target block (CU) using decoded pixel values of the luminance component of the CU, and a chroma component corrector 1812 that corrects the predicted pixel values of the chroma component obtained by the cross-component intra predictor 1811.

The cross-component intra predictor 1811 includes a linear model calculator 1811a and a chroma component predictor 1811b.

The linear model calculator 1811a calculates a linear model of the luminance component and the chroma component of the target block (CU) using decoded pixel values of the luminance component and decoded pixel values of the chroma component (reference pixel values) around the CU, and outputs the calculated linear model to the chroma component predictor 1811b. The linear model calculator 1811a outputs to the chroma component corrector 1812 decoded pixel values that were not used to calculate a linear model of decoded pixel values of the chroma component around the CU.

In particular, in the normal CCIP mode, the linear model calculator 1811a calculates a linear model using decoded pixel values of the luminance component and the chroma component on top of the CU and decoded pixel values of the luminance component and the chroma component on the left of the CU (see FIG. 2).

In the CCIP_A mode, the linear model calculator 1811a calculates a linear model using decoded pixel values of the luminance component and the chroma component on top of the CU without using decoded pixel values of the luminance component and the chroma component on the left of the CU (see FIG. 3). In this case, the linear model calculator 1811a outputs to the chroma component corrector 1812 decoded pixel values of the chroma component around the CU other than the decoded pixel values of the chroma component on top of the CU. Because prediction accuracy is likely to decrease in the bottom edge area of the CU far from the decoded pixel values on top of the CU used to calculate the linear model, it is preferable to give high priority to outputting to the chroma component corrector 1812 decoded pixel values of the chroma component under the CU so that the chroma component in the bottom edge area can be corrected.

In the CCIP_L mode, the linear model calculator 1811a calculates a linear model using decoded pixel values of the luminance component and the chroma component on the left of the CU without using decoded pixel values of the luminance component and the chroma component on top of the CU (see FIG. 4). In this case, the linear model calculator 1811a outputs to the chroma component corrector 1812 decoded pixel values around the CU other than the decoded pixel values on the left of the target block. In the CU, because prediction accuracy is likely to decrease in the right edge area of the CU far from the decoded pixel values on the left of the CU used to calculate the linear model, it is preferable to give high priority to outputting to the chroma component corrector 1812 decoded pixel values of the chroma component on the right of the CU so that the chroma component in the right edge area can be corrected.

The chroma component predictor 1811b predicts pixel values of the chroma component of the CU by applying a linear model input by the linear model calculator 1811a to decoded pixel values of the luminance component of the CU according to expression (1), and outputs the predicted pixel values of the chroma component of the CU to the chroma component corrector 1812.

The chroma component corrector 1812 corrects predicted pixel values of the chroma component of the CU input by the chroma component predictor 1811b, for example, by filtering, using decoded pixel values input by the linear model calculator 1811a (i.e., decoded pixel values that were not used to calculate a linear model).

In particular, in the CCIP_A mode, the chroma component corrector 1812 corrects predicted pixel values of the chroma component in edge areas other than the top edge area of the CU using decoded pixel values around the CU other than the decoded pixel values on top of the CU. For example, the chroma component corrector 1812 corrects predicted pixel values of the chroma component in the bottom edge area of the CU using decoded pixel values of the chroma component under the CU.

Figure 7:
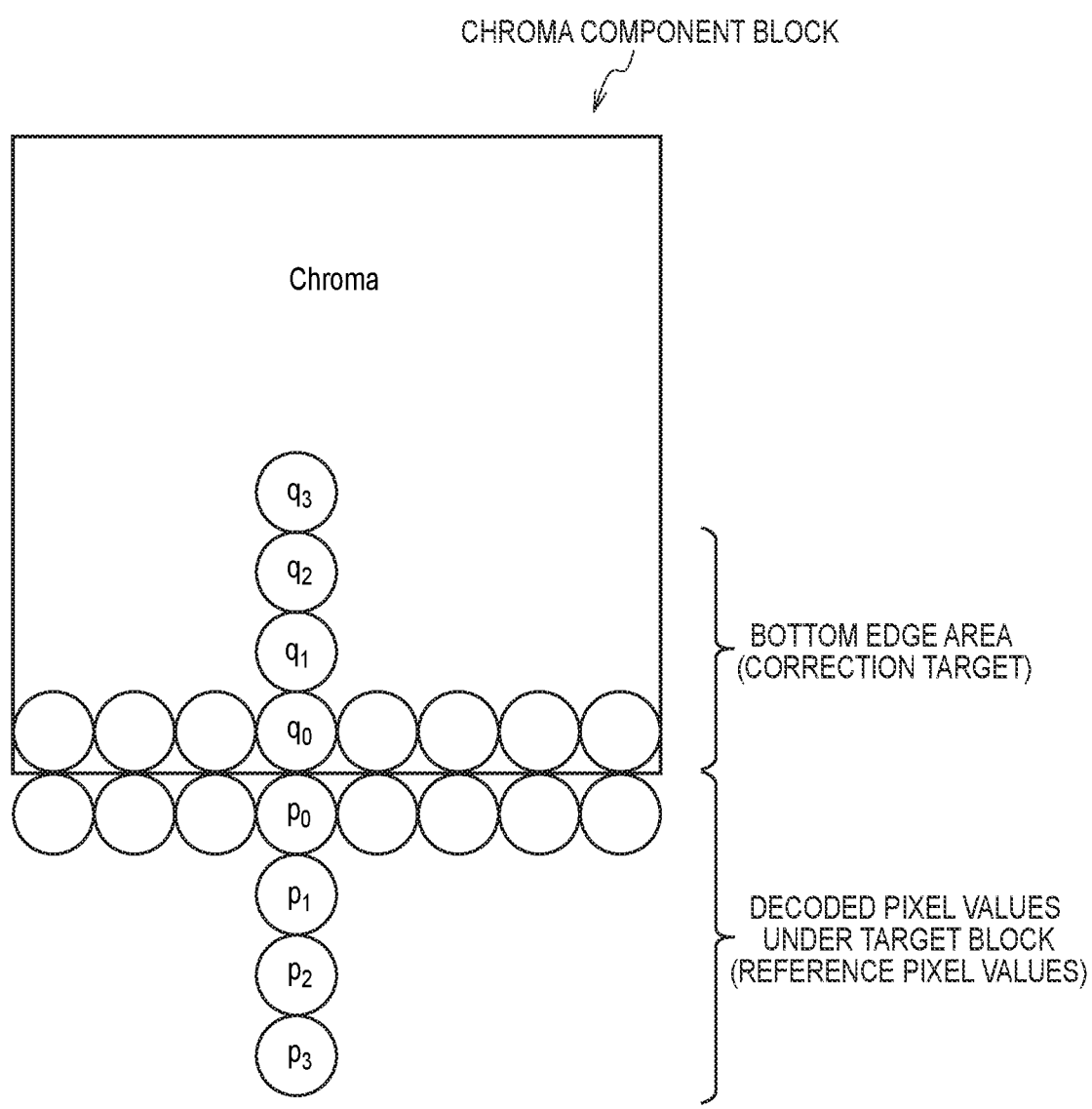
FIG. 7 is a diagram illustrating an example of a correction method in the CCIP_A mode according to the embodiment.

FIG. 7 is a diagram illustrating an example of the correction method in the CCIP_A mode.

As shown in FIG. 7, the chroma component corrector 1812 corrects predicted pixel values of the chroma component in the bottom edge area of a CU by filtering using decoded pixel values of the chroma component under the CU when the decoded pixel values of the chroma component under the CU are available. In particular, the chroma component corrector 1812 corrects predicted pixel values $q_0$, $q_1$ and $q_2$ of the chroma component in the bottom edge area of the CU using decoded pixel values (reference pixel values) $p_0$, $p_1$ and $p_2$ of the chroma component under the CU according to expressions (4) below, and outputs the corrected predicted pixel values $q'_0$, $q'_1$ and $q'_2$.

[Expression 3]

$$q_0'=\text{Clip3}(q_0-2\times tc, q_0+2\times tc, (p_1+2\times p_0+2\times q_0+2\times q_1+q_2+4)>>2)$$

$$q_1'=\text{Clip3}(q_1-2\times tc, q_1+2\times tc, (p_0+q_0+q_1+q_2+2)>>2)$$

$$q_2'=\text{Clip3}(q_2-2\times tc, q_2+2\times tc, (p_0+q_0+q_1++3\times q_2+2\times q_3+4)>>3) \quad (4)$$

In expressions (4), clip (x, max, min) is a function that clips x to max when x is greater than max and to min when x is less than min. Also, in expressions (4), tc is a variable adjusting offset for the clipping function which can be calculated and set by a function using the quantization parameter (Qp).

As described above, in the CCIP_A mode, although prediction accuracy is likely to decrease in the bottom edge area far from the decoded pixel values on top of a CU used to calculate a linear model, the accuracy can be improved by correcting predicted pixel values of the chroma component in the bottom edge area of the CU, whereby energy in a prediction residual corresponding to the bottom edge area can be reduced to improve encoding efficiency.

In the CCIP_L mode, the chroma component corrector 1812 corrects predicted pixel values of the chroma component in edge areas other than the left edge area of a CU using decoded pixel values around the CU other than the decoded pixel values on the left of the CU. For example, the chroma component corrector 1812 corrects predicted pixel values of the chroma component in the right edge area of the CU using decoded pixel values of the chroma component on the right of the CU.

Figure 8:
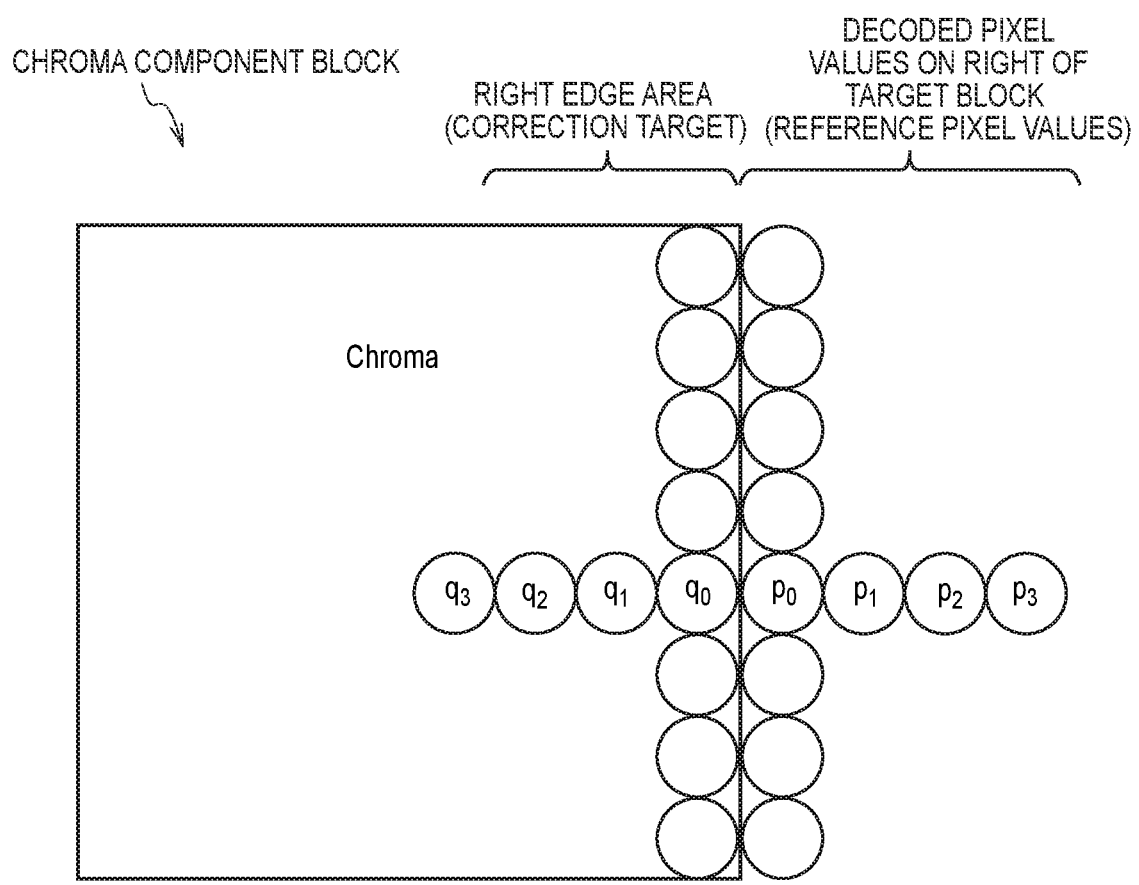
FIG. 8 is a diagram illustrating an example of a correction method in the CCIP_L mode according to the embodiment.

FIG. 8 is a diagram illustrating an example of the correction method in the CCIP_L mode.

As shown in FIG. 8, the chroma component corrector 1812 corrects predicted pixel values of the chroma component in the right edge area of a CU by filtering using decoded pixel values of the chroma component on the right of the CU when the decoded pixel values of the chroma component on the right of the CU are available. In particular, the chroma component corrector 1812 corrects predicted pixel values $q_0$, $q_1$ and $q_2$ of the chroma component in the right edge area of the CU using decoded pixel values (reference pixel values) $p_0$, $p_1$ and $p_2$ of the chroma component on the right of the CU according to expressions (4), and outputs the corrected predicted pixel values $q'_0$, $q'_1$ and $q'_2$.

As described above, in the CCIP_L mode, although prediction accuracy is likely to decrease in the right edge area far from the decoded pixel values on the left of a CU used to calculate a linear model, the accuracy can be improved by correcting predicted pixel values of the chroma component in the right edge area of the CU, whereby energy in a prediction residual corresponding to the right edge area can be reduced to improve encoding efficiency.

4. SUMMARY OF EMBODIMENT

As noted above, the intra predictor 181 includes the chroma component corrector 1812 that corrects predicted pixel values of the chroma component obtained by the chroma component predictor 1811b using decoded pixel values that were not used to calculate a linear model by the linear model calculator 1811a of decoded pixel values around the target block (CU). This can increase accuracy of the predicted pixel values of the chroma component of the CU (i.e., prediction accuracy), thereby improving encoding efficiency.

In the present embodiment, if the linear model calculator 1811a calculates a linear model using decoded pixel values on top of the target block (CU), the chroma component corrector 1812 corrects predicted pixel values of the chroma component in edge areas other than the top edge area of the CU using decoded pixel values around the CU other than the decoded pixel values on top of the CU. This can improve encoding efficiency in the CCIP_A mode.

In the present embodiment, if the linear model calculator 1811a calculates a linear model using decoded pixel values on the left of the target block (CU), the chroma component corrector 1812 corrects predicted pixel values of the chroma component in edge areas other than the left edge area of the CU using decoded pixel values around the CU other than the decoded pixel values on the left of the CU. This can improve encoding efficiency in the CCIP_L mode.

5. ALTERNATIVE EMBODIMENTS

In the embodiment described above, by way of example, the chroma component corrector 1812 corrects predicted pixel values of the chroma component in the CCIP_A and CCIP_L modes. The chroma component corrector 1812 may, however, correct predicted pixel values of the chroma component in the normal CCIP mode.

In the embodiment described above, by way of example, the chroma component corrector 1812 corrects predicted pixel values of the chroma component using decoded pixel values of the chroma component that were not used to calculate a linear model. The chroma component corrector 1812 may, however, corrects predicted pixel values of the chroma component using decoded pixel values of the luminance component that were not used to calculate a linear model.

In the embodiment described above, by way of example, a video signal consists of luminance-chroma components (YCbCr). A video signal may, however, consist of three primary color components (RGB).

A program may be provided to cause a computer to execute the operations of the image encoding device 1 and a program may be provided to cause a computer to execute the operations of the image decoding device 2. The program may be stored in a computer-readable medium. The program can be installed on a computer from a computer-readable medium having the program stored thereon. The computer-readable medium having the program stored thereon may be a non-transitory recording medium. The non-transitory recording medium may include, but is not limited to, a CD-ROM and a DVD-ROM. The image encoding device 1 may be embodied as a semiconductor integrated circuit (chipset, SoC, etc.) by integrating the circuits that execute the respective operations of the image encoding device 1. Similarly, the image decoding device 2 may be embodied as a semiconductor integrated circuit by integrating the circuits that execute the respective operations of the image decoding device 2.

The embodiments have been described in detail above with reference to the drawings. Specific configurations are not limited to the above-described configurations, and various design changes, and the like are possible within the scope not deviating from the gist.

This application claims the priority of Japanese Patent Application No. 2018-152989 (filed on Aug. 15, 2018) the contents of which are all incorporated herein by reference.

The invention claimed is:

1. An intra prediction device for performing intra prediction on each of blocks obtained by dividing an original image in the form of a frame, the intra prediction device comprising:
   a linear model calculator configured to calculate a linear model using decoded pixels of a first component and a second component on predetermined positions around a target block on which the intra prediction is performed;
   a predictor configured to predict pixels of the second component of the target block by applying the linear model calculated by the linear model calculator to decoded pixels of the first component of the target block; and
   a corrector configured to correct predicted pixels of the second component obtained by the predictor based on the predetermined positions of the decoded pixels used by the linear model calculator to calculate the linear model.

2. The intra prediction device according to claim 1, wherein
   the first component is a luminance component, and
   the second component is a chroma component.

3. The intra prediction device according to claim 1, wherein
   the corrector is further configured to correct predicted pixels of the second component obtained by the predictor using decoded pixels that were not used to calculate the linear model by the linear model calculator of decoded pixels around the target block.

4. The intra prediction device according to claim 3, wherein
   the corrector is further configured to correct predicted pixels of the second component obtained by the predictor using decoded pixels of the second component that were not used to calculate the linear model by the linear model calculator of decoded pixels of the second component around the target block.

5. The intra prediction device according to claim 3, wherein the linear model calculator is further configured to calculate the linear model using decoded pixels on top of the target block, and the corrector is further configured to correct predicted pixels of the second component obtained by the predictor using decoded pixels around the target block other than the decoded pixels on top of the target block.

6. The intra prediction device according to claim 5, wherein the corrector is further configured to correct predicted pixels of the second component in edge areas other than a top edge area of the target block.

7. The intra prediction device according to claim 3, wherein the linear model calculator is further configured to calculate the linear model using decoded pixels on left of the target block, and the corrector is further configured to correct predicted pixels of the second component obtained by the predictor using decoded pixels around the target block other than the decoded pixels on the left of the target block.

8. The intra prediction device according to claim 7, wherein the corrector is further configured to correct predicted pixels of the second component in edge areas other than a left edge area of the target block.

9. An image encoding device comprising the intra prediction device according to claim 1.

10. An image decoding device comprising the intra prediction device according to claim 1.

11. A non-transitory computer-readable storage medium with an executable program stored thereon, wherein the program causes a computer to function as the intra prediction device according to claim 1.

* * * * *